US012559043B1

(12) United States Patent
Huenink et al.

(10) Patent No.: US 12,559,043 B1
(45) Date of Patent: Feb. 24, 2026

(54) ADJUSTABLE ELECTRONIC DEVICE HOLDER

(71) Applicant: DEERE & COMPANY, Moline, IL (US)

(72) Inventors: Brian M. Huenink, Cedar Grove, WI (US); Michael W. Thompson, Clayton, IN (US); Tyler J. Van Steenhuyse, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/931,266

(22) Filed: Oct. 30, 2024

(51) Int. Cl.
*B60R 11/02* (2006.01)
*B60R 11/00* (2006.01)

(52) U.S. Cl.
CPC ...... *B60R 11/0241* (2013.01); *B60R 11/0235* (2013.01); *B60R 2011/0012* (2013.01); *B60R 2011/0075* (2013.01); *B60R 2011/0085* (2013.01)

(58) Field of Classification Search
None
See application file for complete search history.

(56) References Cited

U.S. PATENT DOCUMENTS

| | | | |
|---|---|---|---|
| 11,458,872 | B2 | 10/2022 | Mcconoughey et al. |
| 11,554,689 | B2 | 1/2023 | Huenink et al. |
| 2003/0230447 | A1 | 12/2003 | Wulfert et al. |

| | | | | |
|---|---|---|---|---|
| 2016/0204816 | A1* | 7/2016 | Abramovich | ........ H04B 1/3888 |
| | | | | 455/575.8 |
| 2018/0257521 | A1 | 9/2018 | Bittner et al. | |
| 2020/0164811 | A1 | 5/2020 | Carter et al. | |
| 2021/0096597 | A1* | 4/2021 | Balaji | ................... G06F 1/1654 |
| 2021/0261205 | A1 | 8/2021 | Mcconoughey et al. | |
| 2021/0261206 | A1 | 8/2021 | Mcconoughey et al. | |
| 2022/0311974 | A1* | 9/2022 | Huenink | ................ H04N 23/60 |

(Continued)

FOREIGN PATENT DOCUMENTS

| | | |
|---|---|---|
| CN | 214796537 U | 11/2021 |
| DE | 102021201357 A1 | 8/2021 |
| FR | 3082814 A1 | 12/2019 |

OTHER PUBLICATIONS

Tractor Phone Holder, pp. 1-4, [online]. Retrieved from the Internet <URL: https://www.foldagri.com/product/phone-holder-plate/>.

(Continued)

*Primary Examiner* — Eileen M Adams

(57) ABSTRACT

A multiple display supporting device is disposed on an arm of an operator seat of a work vehicle. The multiple display supporting device includes a body, a main display, an extension, and a pivot arm. The main display is connected on a front of the body. The extension extends from a side of the body. The holder is used to hold an electronic device. The pivot arm connects the holder to the extension. An outside edge of the pivot arm is pivotably coupled to an outside edge of the extension along an axis via a hinge between a first operation position and a second operation position. A first angle defined between the pivot arm and the extension in the first operation position is smaller than a second angle defined between the pivot arm and the extension in the second operation position.

13 Claims, 7 Drawing Sheets

(56)        References Cited

U.S. PATENT DOCUMENTS

2023/0121069 A1*    4/2023    Diephuis ............... B60N 3/063
                                                    296/75
2023/0211740 A1      7/2023    Lacross et al.

OTHER PUBLICATIONS

Phone holder Case IH AFS 700 PRO Screen Combine Tractor Easy No Drilling, pp. 1-4, [online]. Retrieved from the Internet <URL: https://www.ebay.com/itm/133840596355>.
John Deere, BL17017: CommandArm Smart Phone Holder Attachment, pp. 1-4, [online]. Retrieved from the Internet <URL: https://shop.deere.com/us/product/BL17017%3A-CommandArm%E2%84%A2-Smart-Phone-Holder-Attachment/p/BL17017>.
U.S. Appl. No. 18/639,057, filed Apr. 18, 2024.
German Search Report issued in application No. 102024131455.9 dated Jul. 8, 2025, 12 pages.

* cited by examiner

ADJUSTABLE ELECTRONIC DEVICE HOLDER

TECHNICAL FIELD

The present disclosure relates generally to a vehicle, in particular to an electronic device holder of the work vehicle.

BACKGROUND

In a work vehicle, such as tractor, an operator seat in a cab is used for the operator to sit, and a command arm included by or coupled to the operator seat is used for tractor or implement control and monitor. A portable electronic device, such as a smart phone, may be held by a holder near a main display that is coupled to the command arm.

SUMMARY

According to an aspect of the present disclosure, a multiple display supporting device is disposed on an arm of an operator seat of a work vehicle. The multiple display supporting device includes a body, a main display, an extension, and a pivot arm. The main display is connected on a front of the body. The extension extends from a side of the body. The holder is used to hold an electronic device. The pivot arm connects the holder to the extension. An outside edge of the pivot arm is pivotably coupled to an outside edge of the extension along an axis via a hinge between a first operation position and a second operation position. A first angle defined between the pivot arm and the extension in the first operation position is smaller than a second angle defined between the pivot arm and the extension in the second operation position.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Present disclosure demonstrates an electronic device holder included by or coupled to the operator seat of a work vehicle. The operator seat is positioned within a cab of the work vehicle. The electronic device holder, with an electronic device such as a smartphone or other portable electronic device, is coupled to an arm extending forward from the operator seat with a proper distance from the operator. The arm, in a non-limiting example, may be a command arm. The electronic device may be disposed next to a main display, which is also coupled to the command arm. The present disclosure includes various structures and implementations allowing the holder to pivot between a first operation position and a second operation position to optimize the viewing angle to the electronic device, while preventing the holder from interfering with adjacent cab surfaces. The placement of the holder therefore balance the clearance, the electronic device viewing angle, and the accessibility to the main display. However, other variations and modifications may be made without departing from the scope and spirit of the present disclosure.

Figure 1:
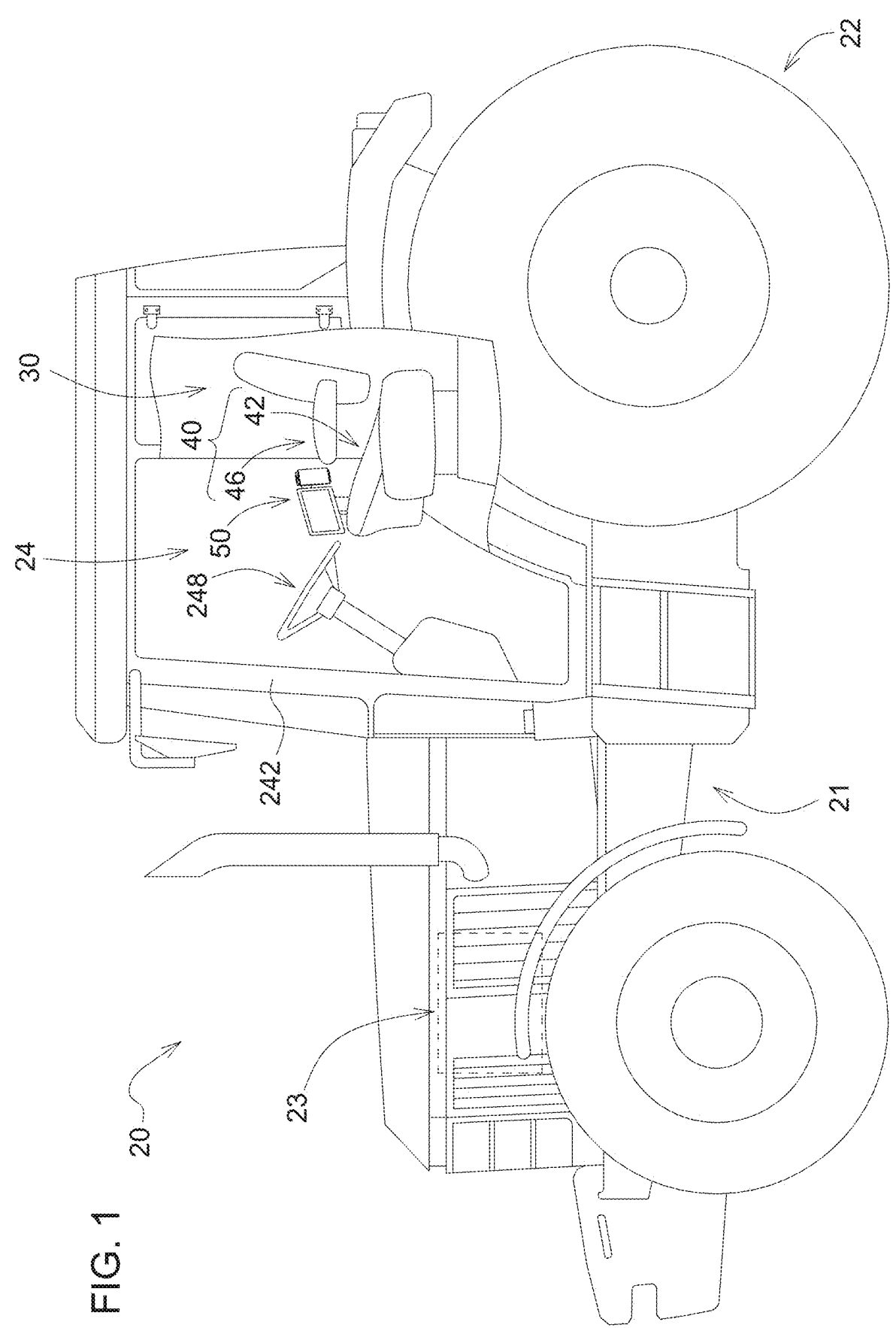
FIG. 1 is a simplified side view of an example work vehicle in the form of a tractor.
Figure 2:
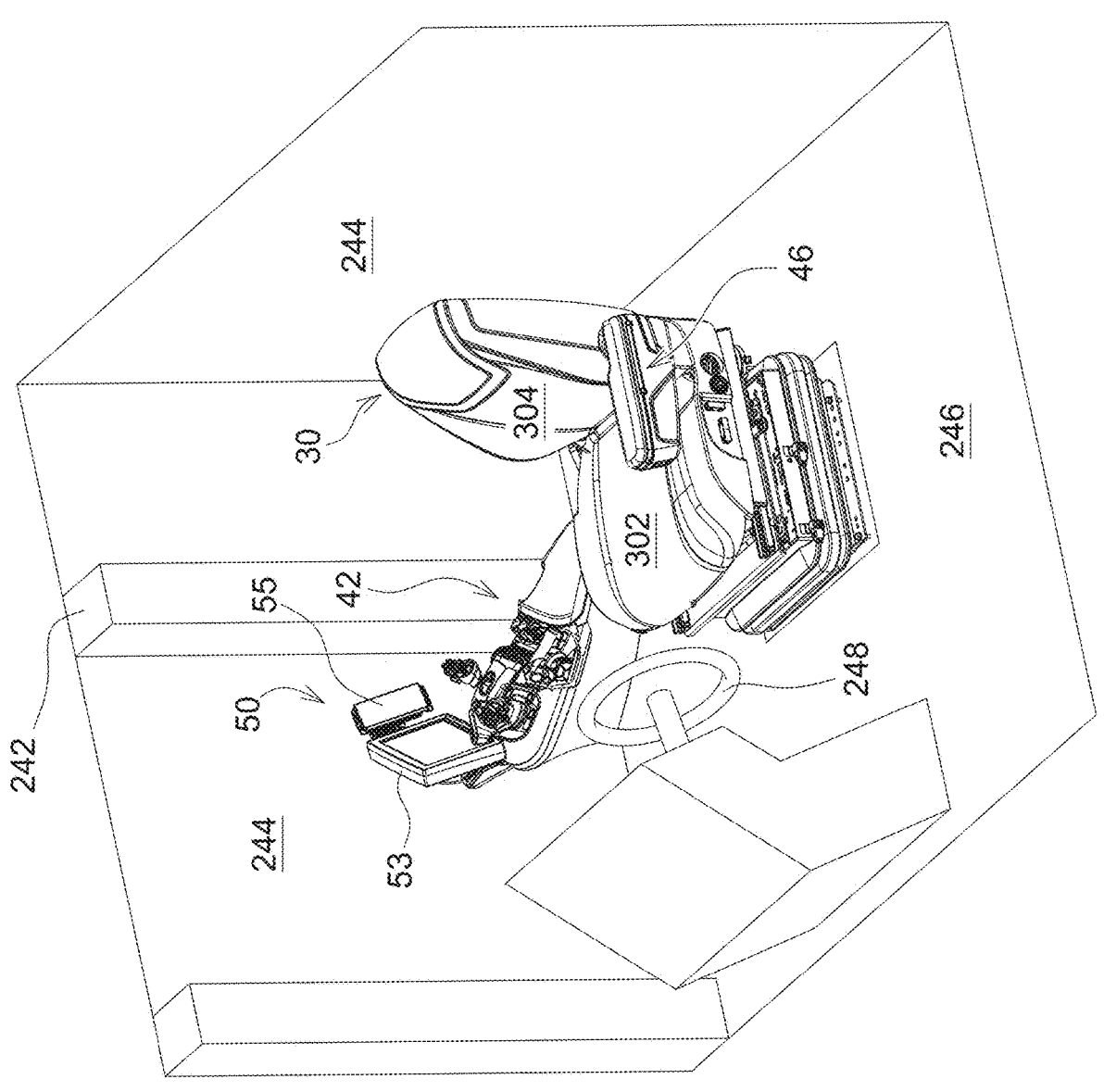
FIG. 2 is a top front perspective view of a cab interior of the work vehicle of FIG. 1.
Figure 3:
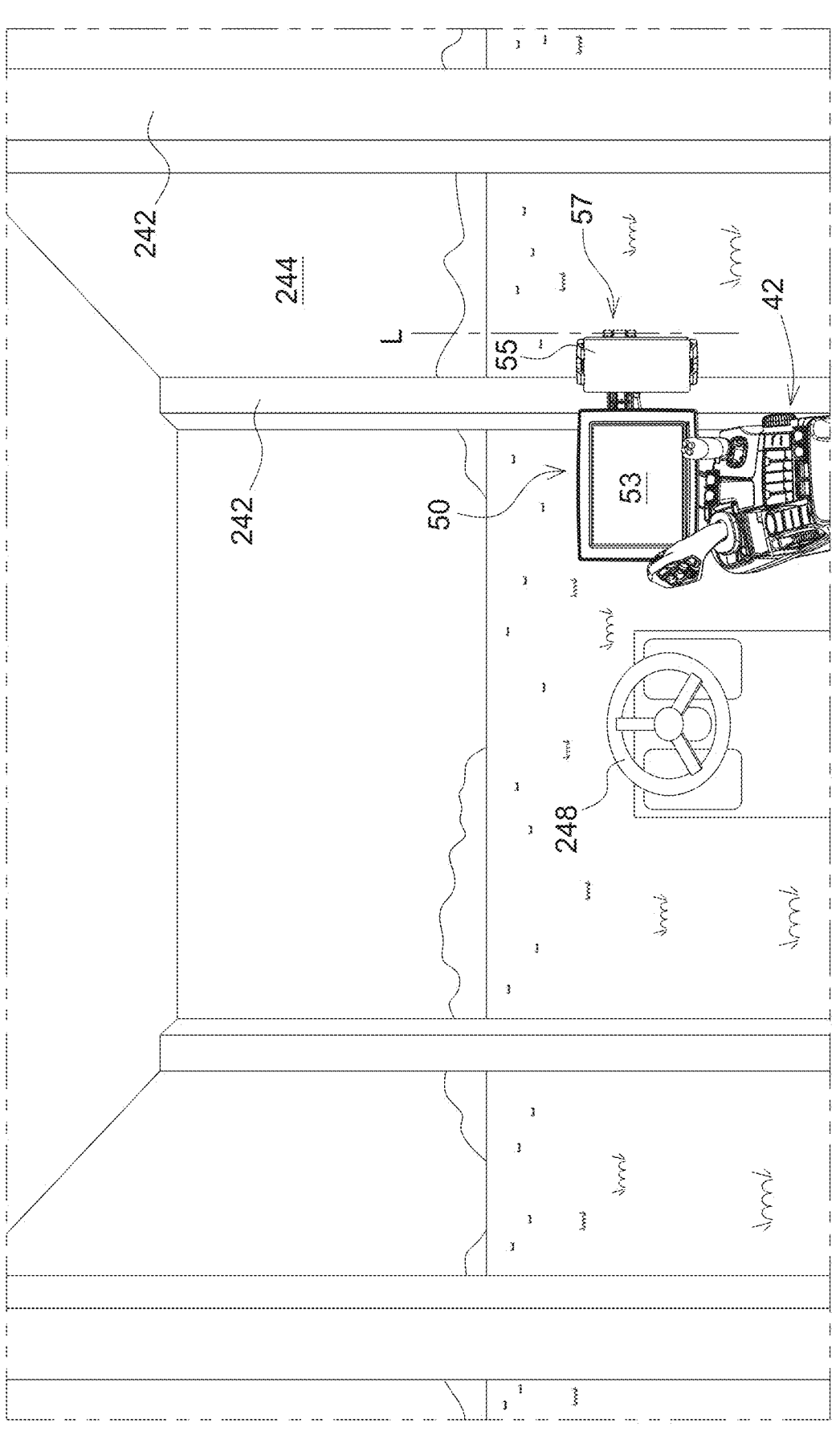
FIG. 3 is an operator's perspective view when the operator sits on an operator seat.
Figure 4A:
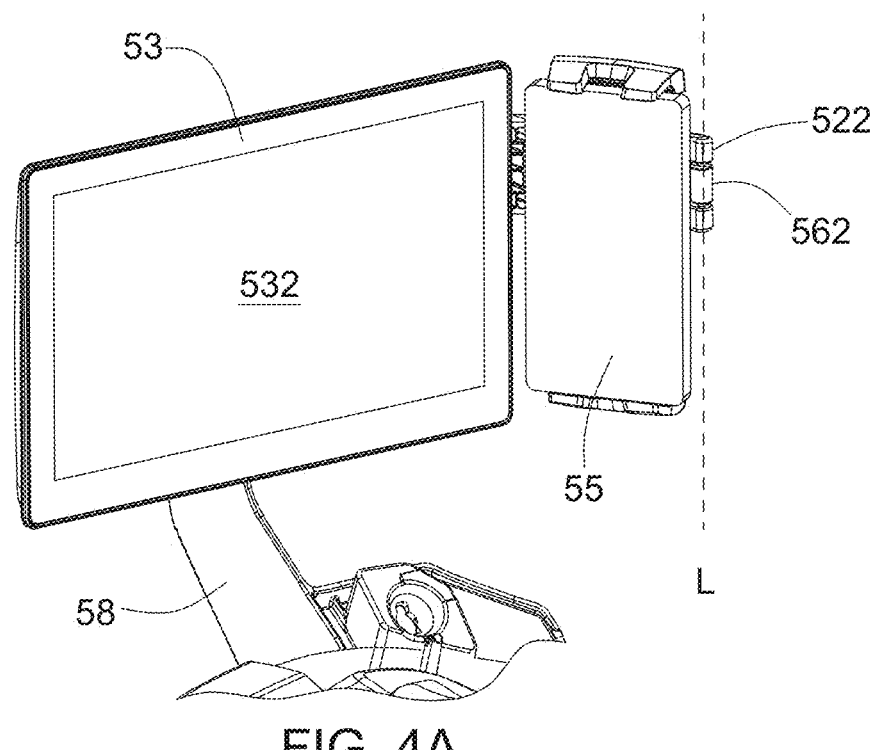
FIG. 4A is a perspective view of a multiple display supporting device when a pivot arm of the multiple display supporting device is in the first operation position.
Figure 4B:
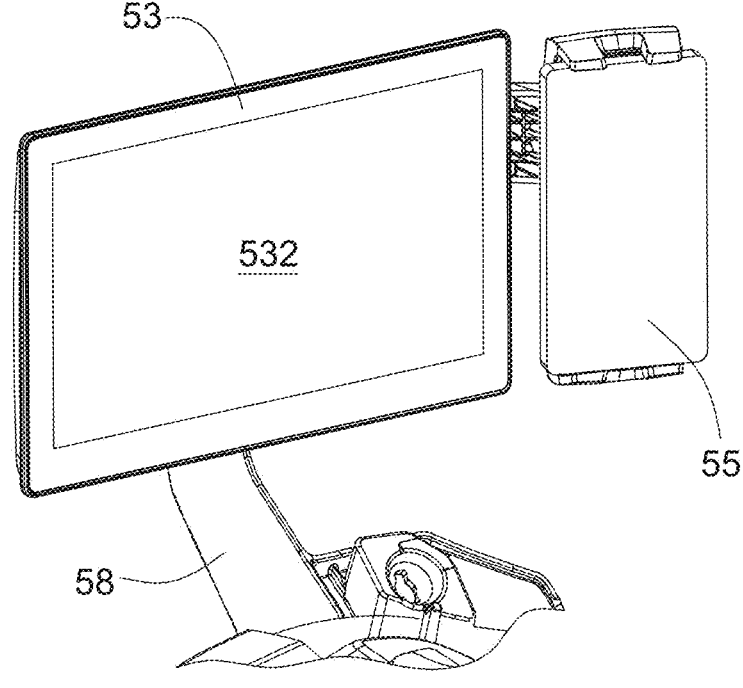
FIG. 4B is a perspective view of the multiple display supporting device when the pivot arm of the multiple display supporting device is in the second operation position.

Referring to FIG. 1, a work vehicle, embodied as a tractor 20, normally includes a mainframe 21, a ground engaging device 22, a power source 23, and a cab 24. The mainframe 21 is supported by the ground engaging device 22, which may be wheels, tracks, or other devices. The ground engaging device 22 engages the ground and is driven by the power source 23 to propel the tractor 20. The mainframe 21 may carry the power source 23, which may be a combustion engine or battery packs and motor(s). It is noted that other drivetrain components or electric vehicle components, includes but are not limited to transmissions, axles, differentials, hydraulic pumps, inverters, are omitted in FIG. 1. The mainframe 21 also supports the cab 24. Referring to FIGS. 1-3, the cab 24 provides an environment for the operator to sit and control the tractor 20. The cab 24 may include cab frame structure 242, a wall 244, a floor 246, and a steering wheel 248. The wall(s) 244 and floor 246 may be installed on the cab frame structure 242. An operator seat 30 may be positioned on the floor 246. The wall 244 (cab surfaces) may include safety glass and/or panel (not shown), defining a cab interior. The steering wheel 248 extends from the front of the cab 24 toward the operator seat 30.

The operator seat 30 includes a seat base 302 and a backrest 304. The seat base 302 has a cushion for the operator to sit. The seat base 302 is a part of a moveable seat portion 36 swivelable relative to a stationary seat portion 32 around a swivel axis. Referring to FIGS. 1-3, the backrest 304 is coupled to the seat base 302 and may be reclinable relative to the seat base 302. The backrest 304 has a cushion which the operator can lean against. The operator seat 30 may also include an arm assembly 40 having a first arm 42 and a second arm 46, which are respectively coupled to the sides of the moveable seat portion 36, as shown in FIG. 2. In this example, the first arm 42 is a command arm, equipped with multiple input devices, including but not limited to a main display 53, physical buttons, and joysticks for the operator to control the tractor 20. The second arm 46 is a rest arm and may allow the operator to place his or her arm for rest. As shown in FIGS. 1-3, the first arm 42 is the right arm of the operator seat 30 and the second arm 46 is the left arm of the operator seat 30. In another embodiment, the first arm 42 can be the left arm of the operator seat 30 and the second arm 46 can be the right arm of the operator seat 30 (not shown). In another embodiment, the first arm 42 and second arm 46 are both command arms or rest arms.

Figure 7:
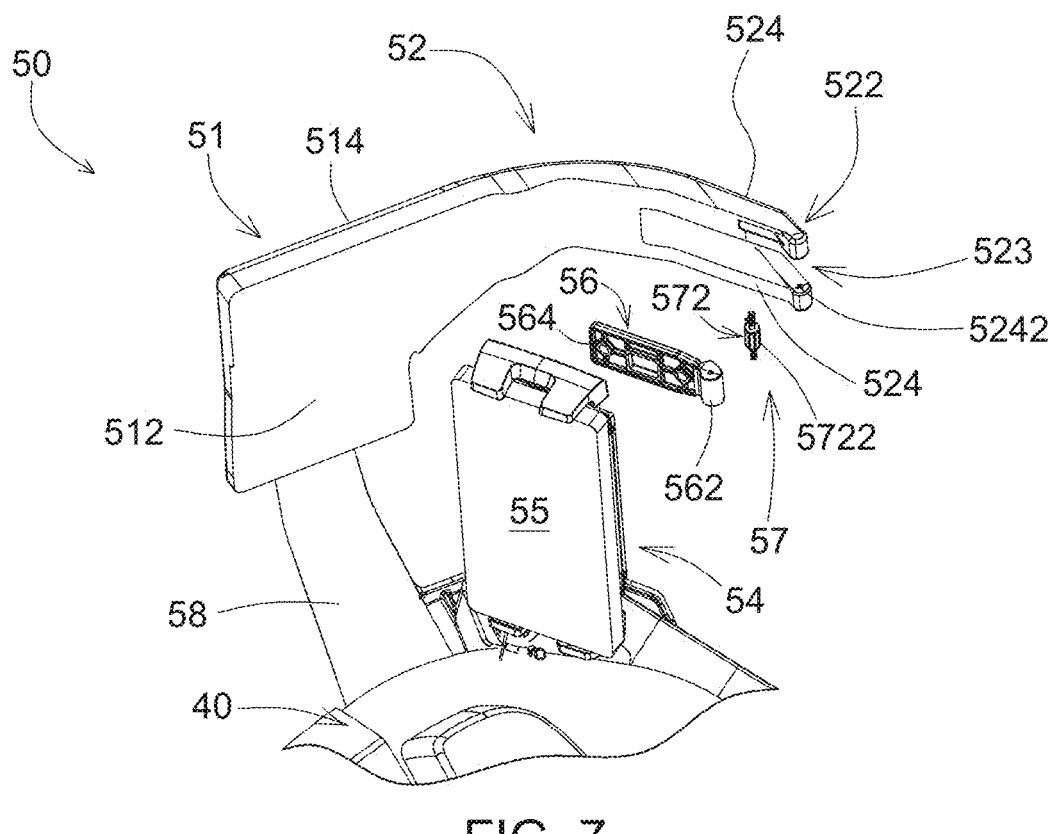
FIG. 7 is an exploded view of the multiple display supporting device, with the main display omitted.

With reference to FIGS. 4A-8, the tractor 20 includes a multiple display supporting device 50, which may be disposed on the arm assembly 40 (e.g., first arm 42 and the second arm 46) of the operator seat 30. The multiple display supporting device 50 may include a body 51, an extension 52, a holder 54, a pivot arm 56, and a hinge 57. The main display 53 is connected to the front 512 of the body 51. The extension 52 extends from a side 514 of the body 51. In one implementation, as shown in FIG. 7, the body 51 and the extension 52 may be a single piece bracket made of plastic or metal. The extension 52 may be curved toward the operator seat 30 to avoid interfering with adjacent cab surfaces, such as wall 244 on the right during the swivel of the operator seat 30 and the movement of the first arm 42. The main display 53 may include a screen 532 (e.g., a touch screen) for the operator to select different operations or control the adjustment. The holder 54 configured to hold an electronic device 55. The electronic device 55, in a non-limiting example, is a smartphone. The holder 54 may include a back panel 542 configured to contact a back of the electronic device 55 and a charger 543 disposed on the opposite of the back panel 542. A cable (not shown) may route through the extension 52 to the charger 543 behind the main display 53. The holder 54, in this implementation, may include two clamping pieces 544, spaced apart and spring loaded, configured to clamp the top and bottom of the electronic device 55. A support 58 may be coupled between the body 51 and the first arm 42. The support 58 may extend upward from a forward distal portion of the first arm 42. The body 51 of the multiple display supporting device 50 and the support 58 may be connected via a ball joint or other types or joint.

Figure 5A:
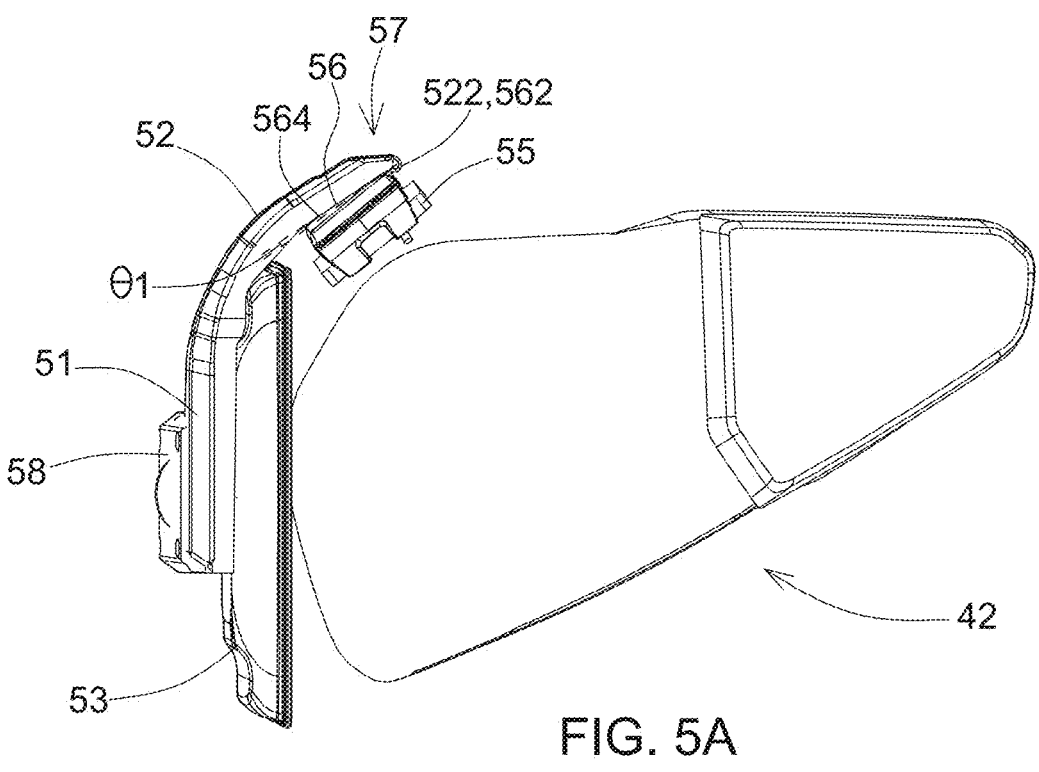
FIG. 5A is a top view of the multiple display supporting device when the pivot arm of the multiple display supporting device is in the first operation position.
Figure 5B:
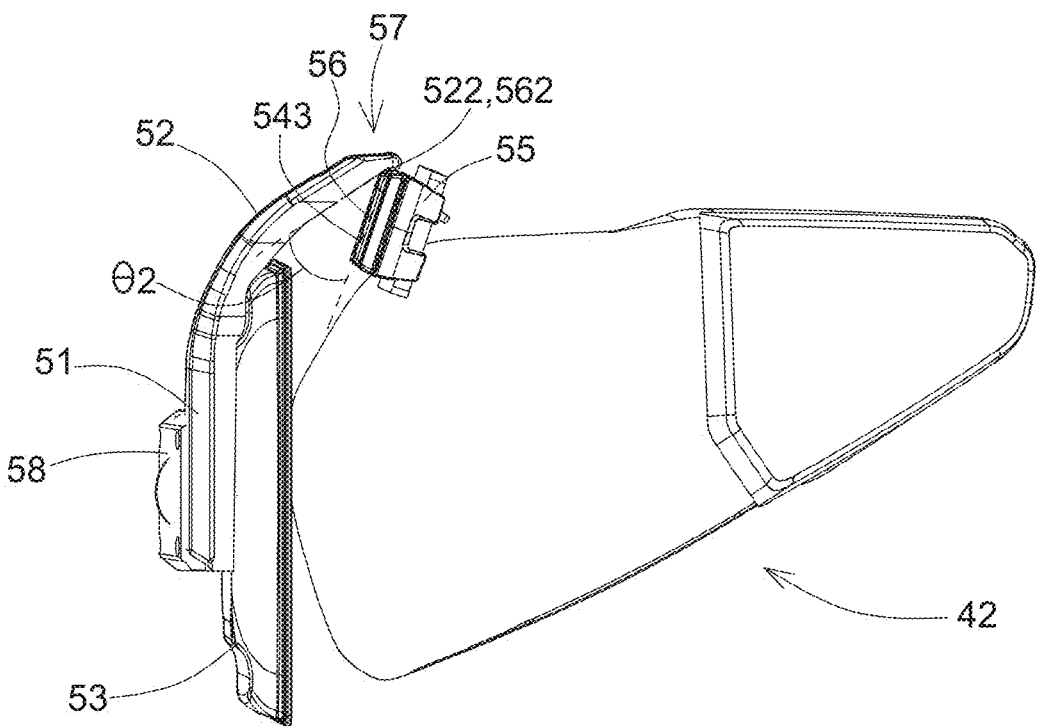
FIG. 5B is a top view of the multiple display supporting device when the pivot arm of the multiple display supporting device is in the second operation position.
Figures 6A, 6B:
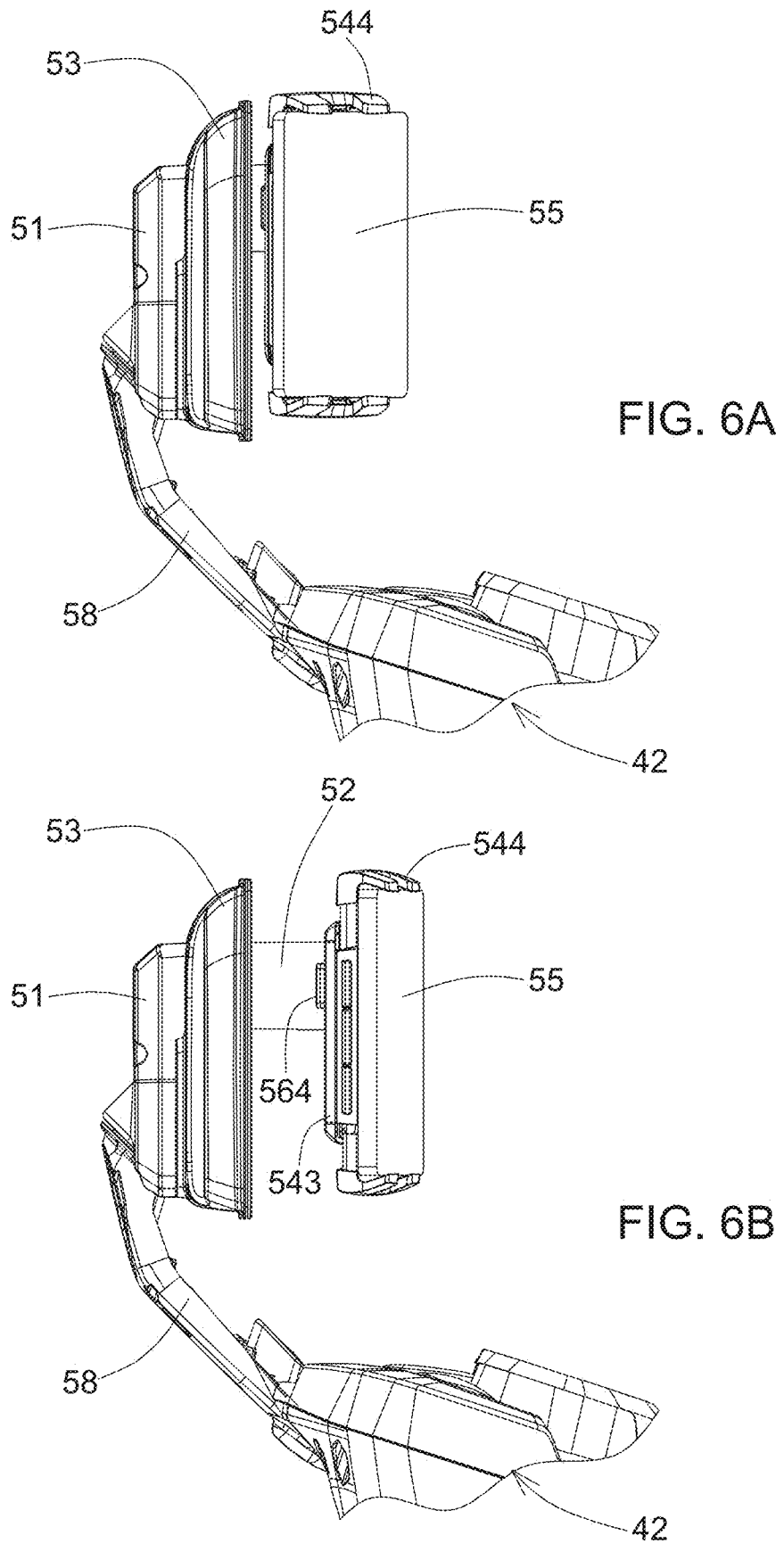
FIG. 6A is a perspective view of the multiple display supporting device when the pivot arm of the multiple display supporting device is in the first operation position.
FIG. 6B is a perspective view of the multiple display supporting device when the pivot arm of the multiple display supporting device is in the second operation position.

The pivot arm 56 connects the holder 54 to the extension 52. In a non-limiting example, the pivot arm 56 is attached to the charger 543 via fastener such as screws. An outside edge 562 of the pivot arm 56 is pivotably coupled to an outside edge 522 of the extension 52 along an axis L via a hinge 57 between a first operation position (FIGS. 4A, 5A, 6A, 7A) and a second operation position (FIGS. 4B, 5B, 6B, 7B). A first angle θ1, as shown in FIG. 5A, defined between the pivot arm 56 and the extension 52 in the first operation position is smaller than a second angle θ2, as shown in FIG. 5B, defined between the pivot arm 56 and the extension 52 in the second operation position. An inside edge 564 of the pivot arm 56 is disposed closer to the extension 52 in the first operation position than the inside edge 564 of the pivot arm 56 in the second operation position. Therefore, the angle between the main display 53 and the electronic device 55 in the first operation position is smaller than the angle between the main display 53 and the electronic device 55 in the second operation position.

Figure 8:
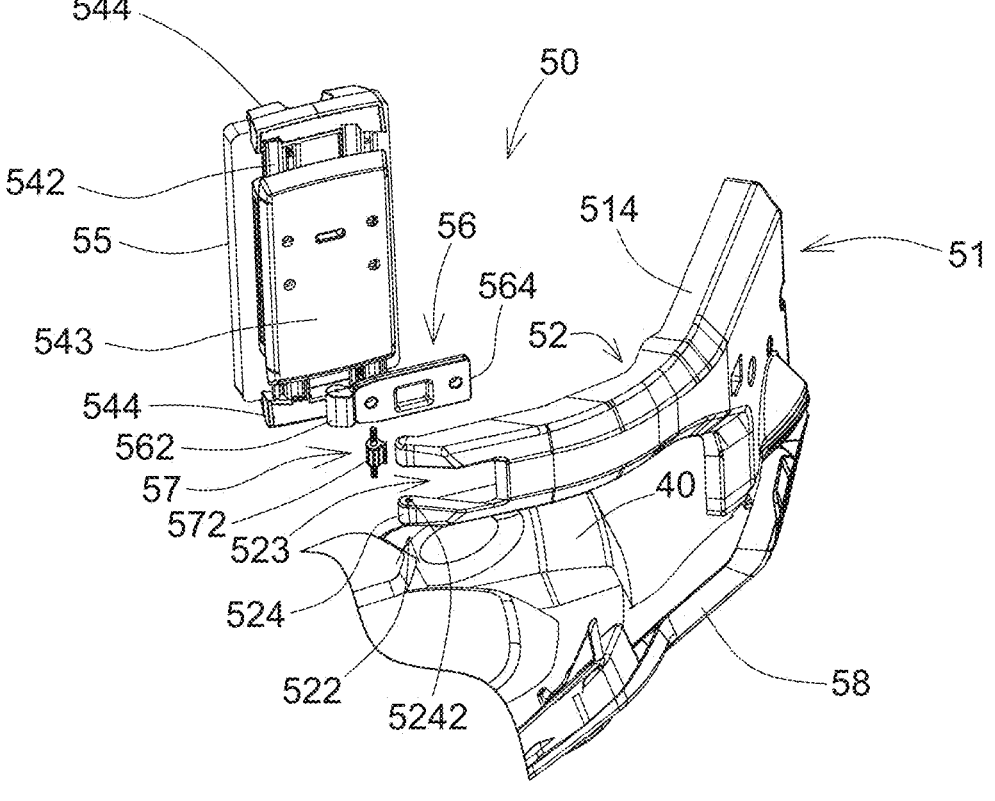
FIG. 8 is another exploded view of the multiple display supporting device, with the main display omitted.

With reference to FIGS. 7 and 8, the outside edge 522 of the extension 52 may include a notch 523 configured to at least partially receive the pivot arm 56 when the pivot arm 56 is pivoted to the first operation position. The outside edge 522 of the extension 52 may also include two legs 524 spaced apart and defining the notch 523 therebetween. The outside edge 562 of the pivot arm 56 is pivotably coupled to the two legs 524. The hinge 57 in this implementation may be a friction hinge, which is infinitely adjustable at any angle between the first operation position and the second operation position. The hinge 57 include a hinge pin 572 and the ends of the hinge pin 572 are respectively inserted into the holes 5242 of the legs 524 of the extension 52. The body 5722 of the hinge pin 572 may be received by the pivot arm 56 at the outside edge 562. The outside edge 562 may has a cylindrical chamber configured to receive the body 5722 of the hinge pin 572. The surface of the body 5722 may include frictional material such as rubber or elastomer that may engage the wall of the cylindrical chamber to provide friction during the rotation of the pivot arm 56. The operator can apply force by hand to rotate the pivot arm 56 beyond the friction for infinite adjustment.

Referring to FIGS. 4A, 5A, 6A, 7A, when the pivot arm 56 in the first operation position, the inner side of the electronic device 55 adjacent to the main display 53 is away from the screen 532 of the main display 53 in a perpendicular direction relative to the main display 53. As such, in the first operation position of the pivot arm 56, the relative position between the pivot arm 56 and the main display 53 may allow the operator to have an optimal viewing angle and/or ensure the hand access to the screen 532, which is a touch screen. The electronic device 55 therefore may not hinder the path of the finger to the screen 532. The angle between the main display 53 and the electronic device 55 in the first operation position, for example, is between 120 to 150 degrees. The first angle θ1 defined between the pivot arm 56 and the extension 52 in the first operation position may be at zero degree (the pivot arm 56 received in the notch 523) or other small degrees, as shown in FIG. 5A.

Referring to FIGS. 4B, 5B, 6B, 7B, when the pivot arm 56 is in the second operation position, the inner side of the electronic device 55 adjacent to the main display 53 at least partially overlaps with the main display 53 in a perpendicular direction relative to the main display 53. As such, in the second operation position of the pivot arm 56, the relative position between the pivot arm 56 and the main display 53 may allow the operator to have an optimal viewing angle for the electronic device 55. The angle between the main display 53 and the electronic device 55 in the second operation position, for example, is between 150 to 180 degrees; when it is generally 180 degrees, the electronic device 55 is parallel to the main display 53. The second angle θ2, as shown in FIG. 5B, defined between the pivot arm 56 and the extension 52 in the second operation position, may be smaller than 90 degrees but larger than the first angle θ1.

Without in any way limiting the scope, interpretation, or application of the claims appearing below, a technical effect of one or more of the example embodiments disclosed herein is to provides a multiple display supporting device that allows the operator to adjust the position of the holder to optimize the viewing angle of the electronic device and increase the accessibility for the hand to use the main display. The holder can be pivoted between the first operation position where the operator may access the entire screen of the main display with the hand and a second operation position where the operator can have an optimal or preferable viewing angle to the electronic device. Another technical effect of one or more of the example embodiments disclosed herein is to prevent the holder from interfering with adjacent cab surfaces, with the outside edge of the pivot arm pivotably coupled to the outside edge of the extension along the axis via the hinge.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A multiple display supporting device disposed on an arm of an operator seat of a work vehicle, the multiple display supporting device comprising:
   a body;
   a main display connected on a front of the body;
   an extension extending from a side of the body;
   a holder configured to hold an electronic device; and
   a pivot arm connecting the holder to the extension, an outside edge of the pivot arm pivotably coupled to an outside edge of the extension along an axis via a hinge between a first operation position and a second operation position, a first angle defined between the pivot arm and the extension in the first operation position smaller than a second angle defined between the pivot arm and the extension in the second operation position;
   wherein when the pivot arm is in the second operation position, an inner side of the electronic device adjacent to the main display at least partially overlaps with the main display in a perpendicular direction relative to the main display.

2. The multiple display supporting device of claim 1, wherein when the pivot arm in the first operation position, the inner side of the electronic device adjacent to the main display is away from a screen of the main display in a perpendicular direction relative to the main display.

3. The multiple display supporting device of claim 1, wherein the hinge is a friction hinge.

4. The multiple display supporting device of claim 1, wherein the extension is curved toward the operator seat.

5. The multiple display supporting device of claim 1, wherein the holder includes a back panel configured to contact a back of the electronic device and a charger disposed on the back panel.

6. The multiple display supporting device of claim 5, wherein the pivot arm is attached to the charger.

7. The multiple display supporting device of claim 1, wherein the body is coupled to the operator seat.

8. The multiple display supporting device of claim 1, wherein the second angle is smaller than 90 degrees.

9. A multiple display supporting device disposed on an arm of an operator seat of a work vehicle, the multiple display supporting device comprising:
   a body;
   a main display connected on a front of the body;
   an extension extending from a side of the body;
   a holder configured to hold an electronic device; and
   a pivot arm connecting the holder to the extension, an outside edge of the pivot arm pivotably coupled to an outside edge of the extension along an axis via a hinge between a first operation position and a second operation position, a first angle defined between the pivot arm and the extension in the first operation position smaller than a second angle defined between the pivot arm and the extension in the second operation position;
   wherein an angle between the main display and the electronic device in the first operation position is smaller than the angle between the main display and the electronic device in the second operation position.

10. The multiple display supporting device of claim 9, wherein the electronic device is parallel to the main display when the pivot arm is in the second operation position.

11. The multiple display supporting device of claim 9, wherein the angle between the main display and the electronic device in the first operation position is between 120 to 150 degrees.

12. A multiple display supporting device disposed on an arm of an operator seat of a work vehicle, the multiple display supporting device comprising:
   a body;
   a main display connected on a front of the body;
   an extension extending from a side of the body;
   a holder configured to hold an electronic device; and
   a pivot arm connecting the holder to the extension, an outside edge of the pivot arm pivotably coupled to an outside edge of the extension along an axis via a hinge between a first operation position and a second operation position, a first angle defined between the pivot arm and the extension in the first operation position smaller than a second angle defined between the pivot arm and the extension in the second operation position;
   wherein the outside edge of the extension includes a notch configured to receive the pivot arm when the pivot arm is pivoted to the first operation position.

13. The multiple display supporting device of claim 12, wherein the outside edge of the extension includes two legs defining the notch, and the outside edge of the pivot arm is pivotably coupled to the two legs.

* * * * *